United States Patent
Supina et al.

(10) Patent No.: US 7,084,589 B1
(45) Date of Patent: Aug. 1, 2006

(54) VEHICLE AND METHOD FOR CONTROLLING POWER TO WHEELS IN A VEHICLE

(75) Inventors: Joseph G. Supina, Belleville, MI (US); Ming Kuang, Canton, MI (US); Fazal Syed, Canton, MI (US); Ryan McGee, Ann Arbor, MI (US); John Czubay, Troy, MI (US); Eric Tseng, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/906,902

(22) Filed: Mar. 11, 2005

(51) Int. Cl.
*H02P 7/00* (2006.01)
*B60L 15/20* (2006.01)

(52) U.S. Cl. .................... 318/139; 318/433; 180/65.8

(58) Field of Classification Search ............... 318/139, 318/430–434; 320/149–153; 180/65.1, 180/65.3, 65.4, 65.8
See application file for complete search history.

(56) References Cited

U.S. PATENT DOCUMENTS

| | | | |
|---|---|---|---|
| 3,686,549 A * | 8/1972 | Winebrener ................. 318/139 |
| 4,558,281 A * | 12/1985 | Codd et al. ................. 324/433 |
| 5,226,390 A | 7/1993 | Nakagawa | |
| 5,345,154 A * | 9/1994 | King ............................ 318/49 |
| 5,778,326 A * | 7/1998 | Moroto et al. ................ 701/22 |
| 6,608,482 B1 * | 8/2003 | Sakai et al. ................. 324/426 |
| 6,624,636 B1 * | 9/2003 | Arai et al. ................... 324/426 |
| 6,870,336 B1 * | 3/2005 | Murakami et al. .......... 318/432 |
| 2002/0195288 A1 | 12/2002 | Komiyama et al. | |
| 2003/0052650 A1 | 3/2003 | Gunji | |
| 2003/0094816 A1 | 5/2003 | Kazama | |
| 2004/0036434 A1 | 2/2004 | Chen et al. | |
| 2005/0212487 A1 * | 9/2005 | Sodeno ....................... 320/132 |

* cited by examiner

*Primary Examiner*—Bentsu Ro
(74) *Attorney, Agent, or Firm*—David B. Kelley; Brooks & Kushman

(57) ABSTRACT

A method for controlling power to wheels in a vehicle, the vehicle having an electric storage device for providing power to an electric machine. The method includes determining a first power demand for the vehicle based at least in part on a driver input, determining a second power demand based at least in part on the magnitude of the first power demand, determining a power adjustment based on at least one condition of the battery, and applying the power adjustment to the second power demand, thereby generating a wheel power request.

18 Claims, 3 Drawing Sheets

VEHICLE AND METHOD FOR CONTROLLING POWER TO WHEELS IN A VEHICLE

BACKGROUND OF THE INVENTION

1. Field of the Invention

The invention relates to a vehicle and method for controlling power to wheels in a vehicle.

2. Background Art

In recent years, automobile manufacturers have developed vehicles powered at least in part by electric power sources. Electric vehicles generally fall into one of three categories: pure electric vehicles (EVs), hybrid electric vehicles (HEVs), and fuel cell electric vehicles (FCEVs). Each of these three vehicle types can be propelled by one or more electric motors, which in turn, receive power from an energy storage device, such as a battery or a capacitor.

Unlike gasoline, which contains the same amount of energy regardless of the amount of gasoline stored in the vehicle, the available energy and power of a battery vary depending upon the condition of the battery, e.g., battery state of charge, battery temperature, and the like. Accordingly, it is desirable that the power draw from the battery be controlled to ensure correct operation of the vehicle.

One method of regulating battery power draw is by using a motor control system that establishes an upper limit under which the driver power demand, i.e., torque demanded by the vehicle operator, must reside. By limiting the value of the driver power demand to less than a predetermined limit, the motor control system attempts to maintain the battery voltage within a range that is sufficient to prevent the electric motor (or motor inverter) from shutting down due to an over discharge condition.

One example of a system and method for motor control is disclosed in U.S. Patent Application Publication No. 2004/00364434 to Chen et al. ("Chen"). Chen discloses a closed loop permanent magnet motor control method and system to optimally partition torque and flux-weakening currents to produce a desired torque without exceeding the capabilities of the DC power source. According to the Chen system, if the demanded torque current is higher than the maximum torque current limit, then the magnitude of the flux current is increased by adding together the peak-torque-per-amp component of the flux current and the output of a proportional-plus-integral (PI) controller. The PI controller operates on the difference between the demanded torque current and the commanded torque current, and ensures that the demanded torque current does not exceed the maximum torque current limit. In this manner, the motor can produce torque at the maximum capability of the motor while transitioning into and out of the flux-weakening region.

One limitation of the approach disclosed by Chen is that the maximum demand limit, i.e., Lmax, is difficult to estimate accurately. As such, the driver power demand signal may not be limited properly, causing the battery to be operated out of its operating range. In addition, this approach does not address battery over discharge conditions that result from inaccuracies in the motor torque control mechanism. Since inaccuracies in the control mechanism may result in a greater battery power draw than would normally be associated with a given power demand signal, a battery over discharge condition may result even though the power demand signal was determined to be within the limits. Similarly, the inability to accurately predict additional power demands necessitated by losses in the system may result in a battery over discharge condition, even though the power demand signal was within the demand limits.

Accordingly, it would be desirable to have a vehicle and method for controlling the power to the wheels of a vehicle such that battery over discharge occurrences are reduced or eliminated.

SUMMARY OF THE INVENTION

One advantage of the present invention is that it provides a vehicle, and method for controlling the power to the wheels in a vehicle, that reduces or eliminates battery over discharge conditions.

The present invention provides a method for controlling the power to the wheels in a vehicle. The vehicle has an energy storage device for providing power to an electric machine. The method includes the steps of determining a first power demand for the vehicle based at least in part on a driver input, determining a second power demand based at least in part on the magnitude of the first power demand, determining a power adjustment based on at least one condition of the energy storage device, and applying the power adjustment to the second power demand, thereby generating a power request for the vehicle wheels.

The determination of a power adjustment based on at least one condition of an energy storage device, such as a battery, allows the power demand to be modified in response to the actual state of the power source, i.e., the battery. Accordingly, if a given power request causes the battery voltage to drop below a calculated reference discharge voltage, the power adjustment may be applied to the power demand such that the battery voltage is maintained above the reference value. In this manner, over discharge occurrences may be reduced by ensuring that the power demand does not exceed the true capacity of the vehicle power source.

The present invention generally provides a robust method for reducing or preventing an energy storage device, such as a battery, from over discharging. The present invention generally provides the advantage of prolonging battery life by reducing or preventing damage to the battery.

DETAILED DESCRIPTION OF THE PREFERRED EMBODIMENT(S)

Figure 1:
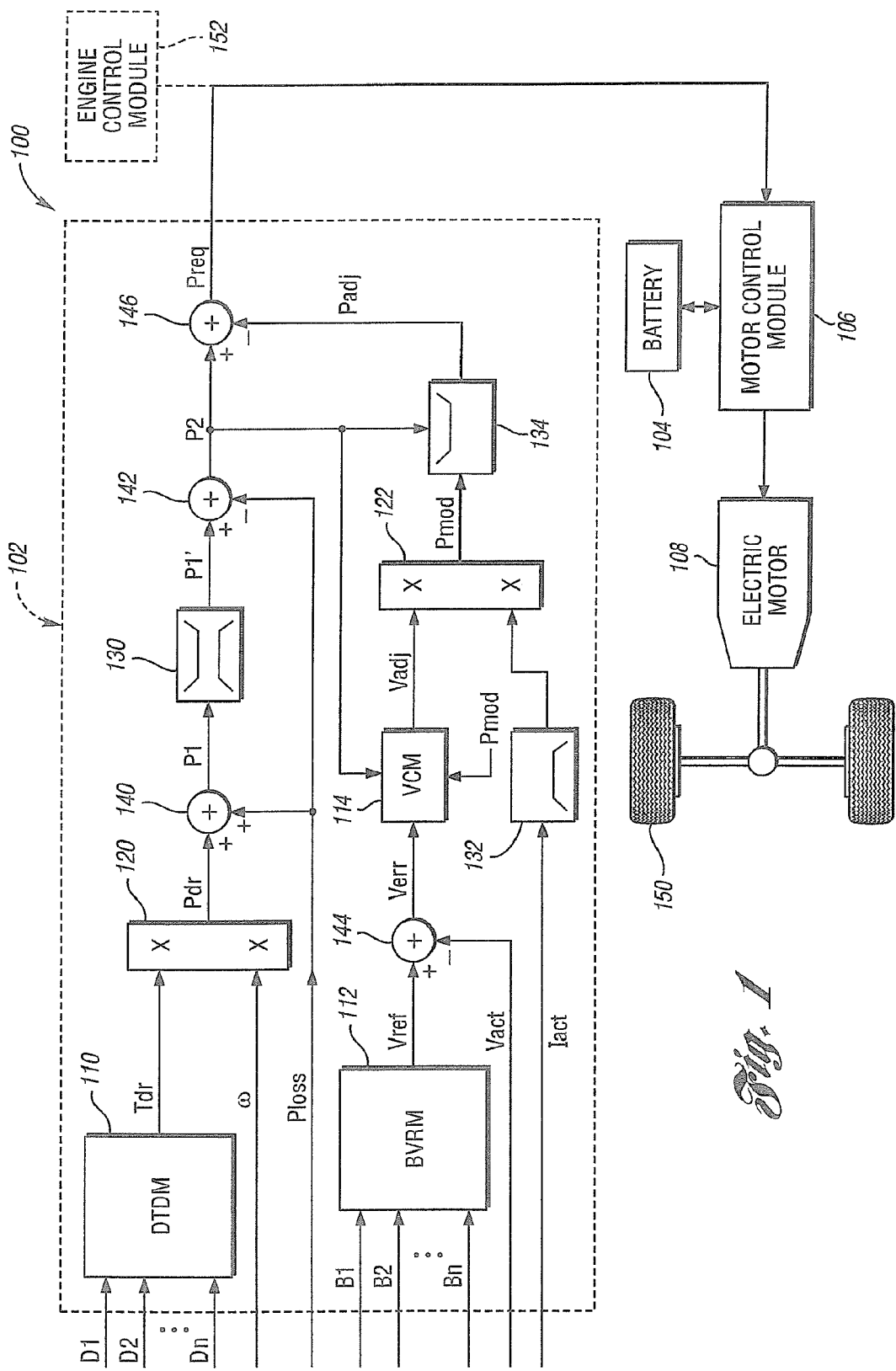
FIG. 1 is a schematic diagram of a portion of a vehicle in accordance with the present invention.

FIG. 1 is a schematic diagram illustrating a portion of a vehicle 100 in accordance with the present invention. The vehicle 100 includes a control system having at least one controller 102. The vehicle 100 further includes an energy storage device, or battery 104, a motor control module 106, a plurality of wheels 150, and an electric machine, or motor 108. Of course, other vehicle configurations that include more than one electric machine and configurations that include one or more engines (not shown), are also contemplated within the scope of the present invention. Moreover, other energy storage devices such as capacitors, can also be used to supply power to the electric machines.

As shown in FIG. 1, the at least one controller 102, such as a vehicle system controller (VSC), includes a driver torque demand module (DTDM) 110, a battery voltage reference module (BVRM) 112, a voltage control module (VCM) 114, multiplication modules 120, 122, limit modules 130, 132, 134, and addition/subtraction modules 140, 142, 144, 146. It is contemplated that all or part of the functionality of the components in the controller 102 may be incorporated into a single vehicle controller as shown in FIG. 1. Alternatively, they may be distributed among a plurality of vehicle controllers. Controller inputs and outputs may be received and passed between controllers via a Controller Area Network (CAN), dedicated communication wires, and the like.

The DTDM 110 generally receives at least one driver demand input signal (i.e., D1. D2 . . . Dn). The driver input signal may correspond to a position of a vehicle accelerator pedal (not shown), a position of a vehicle brake pedal (not shown), or any driver demand that can be used in the generation of a wheel power demand.

The DTDM 110 uses the driver input signals to generate a driver torque demand (Tdr). The driver torque demand (Tdr) represents the total wheel torque required to satisfy the demand of the driver. The DTDM 110 sends the Tdr signal to the multiplication module 120. The module 120 receives a vehicle wheel angular velocity signal ($\omega$) and the Tdr signal. A driver demand power (Pdr) is generated by determining the product of Tdr and $\omega$.

A first power demand (P1) is generated at the addition module 140 by determining the sum of the electrical losses (P_loss) of the vehicle 100 and the driver power demand. The electrical losses of the vehicle 100 may be determined by referencing a vehicle speed and motor torque in a lookup table. Alternatively, P_loss may be mathematically calculated from the vehicle speed and torque, or it may be set to zero. In general, P_loss may be determined by any appropriate mechanism to meet the design criteria of a particular application.

An intermediate power demand, P1', is generated by evaluating P1 at the limit module 130. The evaluation includes the step of comparing the value of P1 to first and second predetermined values, or upper and lower limits, Lmax and Lmin. Under normal vehicle operating conditions, the value of Lmax may represent the maximum power available to the wheels 150. Restricting the first power demand, P1, to a value less than or equal to Lmax, helps to ensure that P1 will not exceed the power capabilities of the battery 104. In practice, it may be difficult to accurately determine the value of Lmax. Therefore, methods which rely exclusively on a limit module such as the module 130, to modify a power demand, can still allow the power demand to cause a battery over discharge condition.

The value of Lmin may be set to a predetermined power demand below which the vehicle battery 104 enters a recharge mode. Accordingly, restricting P1 to a value greater than or equal to Lmin helps to ensure that the battery recharge mode is not repeatedly interrupted. Using the limit module 130, the value of P1' is set equal to P1 when P1 is less than or equal to Lmax and greater than or equal to Lmin. Similarly, P1' is set equal to Lmax when P1 is greater than Lmax, and is set to zero when P1 is less than Lmin. The addition/subtraction module 142 generates a second power demand (P2) by subtracting the value of P_loss from the value of P1'. After P2 is determined, a power adjustment (Padj) is applied to generate a power request for the wheels 150 (Preq).

The determination of Padj includes the step of determining a battery reference discharge voltage (Vref). The reference voltage, Vref, is determined by the BVRM 112. The BVRM 112 generally receives at least one battery status input signal, i.e., B1, B2 . . . Bn, that is used in the determination of Vref. The battery status input signal may correspond to the state of charge (SOC) of the battery 104, or the temperature of the battery 104. In general, the battery status input signal can represent any battery parameter, or combination of parameters, that can be used to determine a reference voltage, such as the voltage Vref. In one embodiment, Vref is determined by referencing the battery state of charge and temperature in a lookup table stored in the BVRM 112. In another embodiment, Vref is mathematically calculated from the battery state of charge and the battery temperature.

A voltage error (Verr) is determined at the addition/subtraction module 144 by subtracting a measured, or actual, battery voltage, Vact, from the battery reference discharge voltage, Vref. Accordingly, Verr is positive when the actual battery voltage, Vact, is below the reference voltage, Vref. Conversely, Verr is negative when Vact is above Vref. After Verr is determined, it is sent to the voltage control module 114.

The voltage control module 114 generally maintains the system battery voltage at a level above the determined reference voltage by generating a voltage adjustment signal, Vadj. The voltage control module 114 may include a proportional controller (P), in which case the Vadj signal will include a proportional component. Alternatively, the control module 114 may include a proportional-integral controller (PI), and the Vadj signal will include proportional and integral components. The control module 114 may also include a proportional-integral-differential controller (PID), in which case and the Vadj signal will include proportional, integral, and differential components. The control module 114 may include a lookup table, where Vadj corresponds to particular values of the voltage error, Verr.

When the voltage adjustment, includes a proportional component, and the voltage error is negative, the proportional component of the voltage adjustment is set to zero. As such, the proportional component of the voltage adjustment is generally inactive when the battery voltage, Vact, is above the reference voltage, Vref.

Similarly, when Vadj includes an integral component (I), the integral component remains unvaried when the product of Vadj and a measured battery current draw (Iact) is greater than the value of P2. Furthermore, the I term is set equal to zero when I is negative because the negative I term generally indicates that the battery 104 is not over discharging, i.e., the battery voltage is greater than the battery reference voltage so no action is required.

A power modifier, Pmod, is determined at the multiplication module 122 as the product of Vadj and Iact. When the actual battery current, Iact, is negative, the battery 104 may be charging. As such, the limit module 132 sets the value of Iact to zero when Iact is negative. Accordingly, the power modifier, Pmod, is generally zero when the battery 104 is charging.

The power adjustment, Padj, is determined at the limit module 134, by setting Padj equal to the power demand modifier, Pmod, when the power demand modifier is not greater than the second power demand, P2. Conversely, the power adjustment, Padj, is set equal to P2 when Pmod is greater than P2. Accordingly, Pmod is modified such that a final power request signal (Preq) is never negative. A negative Preq would cause the wheels 150 to rotate in a direction counter to the direction requested by the driver via the driver torque demand (Tdr).

The addition/subtraction module 146 generates the power request signal, Preq, by determining the difference between the second power demand, P2, and the power adjustment, Padj. In one embodiment of the present invention, Preq is implemented in conjunction with at least one of an EV and a FCEV. In EV and FCEV implementations, Preq is presented to the motor control module 106. The motor control module 106 generally acts to draw the power request, Preq, from the battery 104, and conveys the power to the motor 108. In another embodiment, however, Preq is implemented in conjunction with a HEV. In an HEV implementation, Preq may be split between the motor control module 106 and an engine control module 152 (shown in phantom). The engine control module 152 generally controls the production of wheel torque by an associated engine (not shown). As one skilled in the art would recognize, the method of splitting the signal Preq, and converting Preq to physical wheel torque is beyond the scope of the present invention and does not generally affect the determination of Preq. As such, Preq may be implemented in any vehicle configuration and with any combination of engines and motors to satisfy the design criteria of a particular application.

Figure 2:
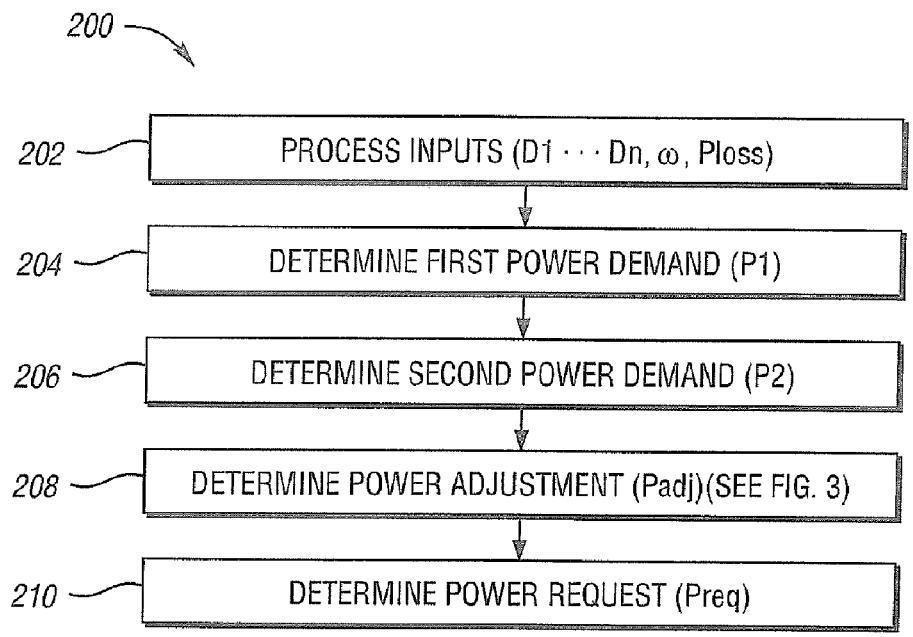
FIG. 2 is a flow diagram illustrating a method of the present invention.

Turning to FIG. 2, a flow diagram 200 of a method of the present invention is shown. The method 200 may be advantageously implemented in connection with the vehicle 100 of the present invention. A controller, for example, the DTDM 110, receives vehicle status input signals, such as driver input signals (D1 . . . Dn), angular velocity signals (ω), electric loss signals (P_loss), and the like (see step 202).

As discussed above, the DTDM 110 then determines the first power demand (P1) based at least in part on a driver input (step 204). The first power demand may be generated by determining the product of the driver torque demand (Tdr) and a measured wheel speed (ω). Alternatively, the first power demand may be generated by adding a determined electrical power loss (P_loss) to the product of a driver desired wheel torque and a measured wheel speed.

The controller then determines the second power demand (P2) based at least in part on the magnitude of the first power demand (step 206). The second power demand signal may be determined by setting the second power demand equal to the first power demand when the magnitude of the first power demand is not greater than a predetermined value, Lmax. The second power demand is set equal to Lmax when the magnitude of the first power demand is greater than Lmax. In another embodiment, the second power demand is determined by subtracting the determined electrical power loss (P_loss) from the first power demand when the magnitude of the first power demand is not greater than Lmax. If the magnitude of the first power demand is greater than Lmax, the second power demand is determined by subtracting P_loss from Lmax. The power adjustment signal (Padj) is determined based on at least one condition of the battery 104, as shown in detail in FIG. 3 (step 208). A wheel power request (Preq) is generated by applying the power adjustment, Padj, to the second power demand, P2 (step 210).

Figure 3:
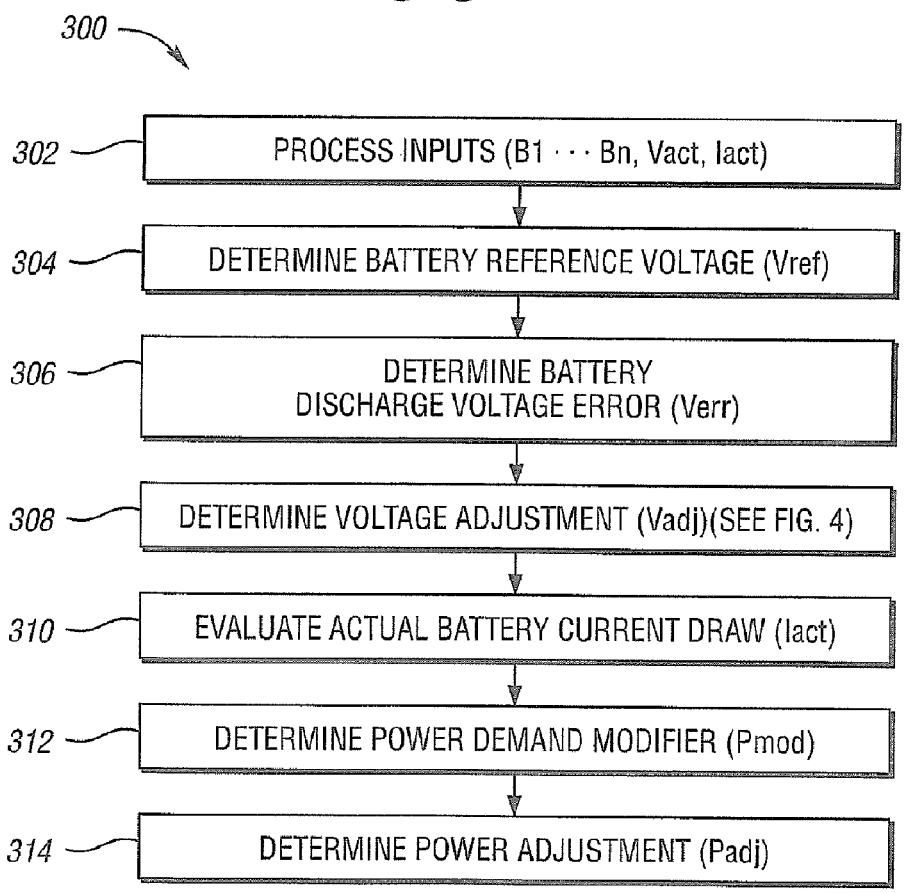
FIG. 3 is a flow diagram of a power adjustment determination represented in FIG. 2.

Referring to FIG. 3, a flow diagram of a power adjustment determination of the present invention is shown. The method 300 may be advantageously implemented in connection with the operational flow diagram 200 shown in FIG. 2. The BVRM 112 receives battery status input signals (step 302). The battery status inputs may include battery state of charge signals, battery temperature signals, battery voltage signals (Vact), battery current draw signals (Iact), and the like. The BVRM 112 determines the battery reference voltage (Vref) based upon at least one of the battery status input signals (step 304). The battery discharge voltage error (Verr) is generated by determining the difference between the battery voltage, Vact, and the battery reference voltage signal, Vref (step 306). The voltage adjustment (Vadj) is determined as shown in detail in FIG. 4 (step 308). The battery current draw, Iact, is evaluated and set to zero when the current draw is determined to be negative, i.e., when the battery is in recharge mode (step 310).

The power demand modifier (Pmod) is generated by determining the product of the voltage adjustment, Vadj, and the battery current draw (step 312). The power adjustment (Padj) is then determined by setting Padj equal to the Pmod when the magnitude of Pmod is not greater than the second power demand. The power adjustment is set equal to the second power demand when the magnitude of Pmod is greater than the second power demand (step 314).

Figure 4:
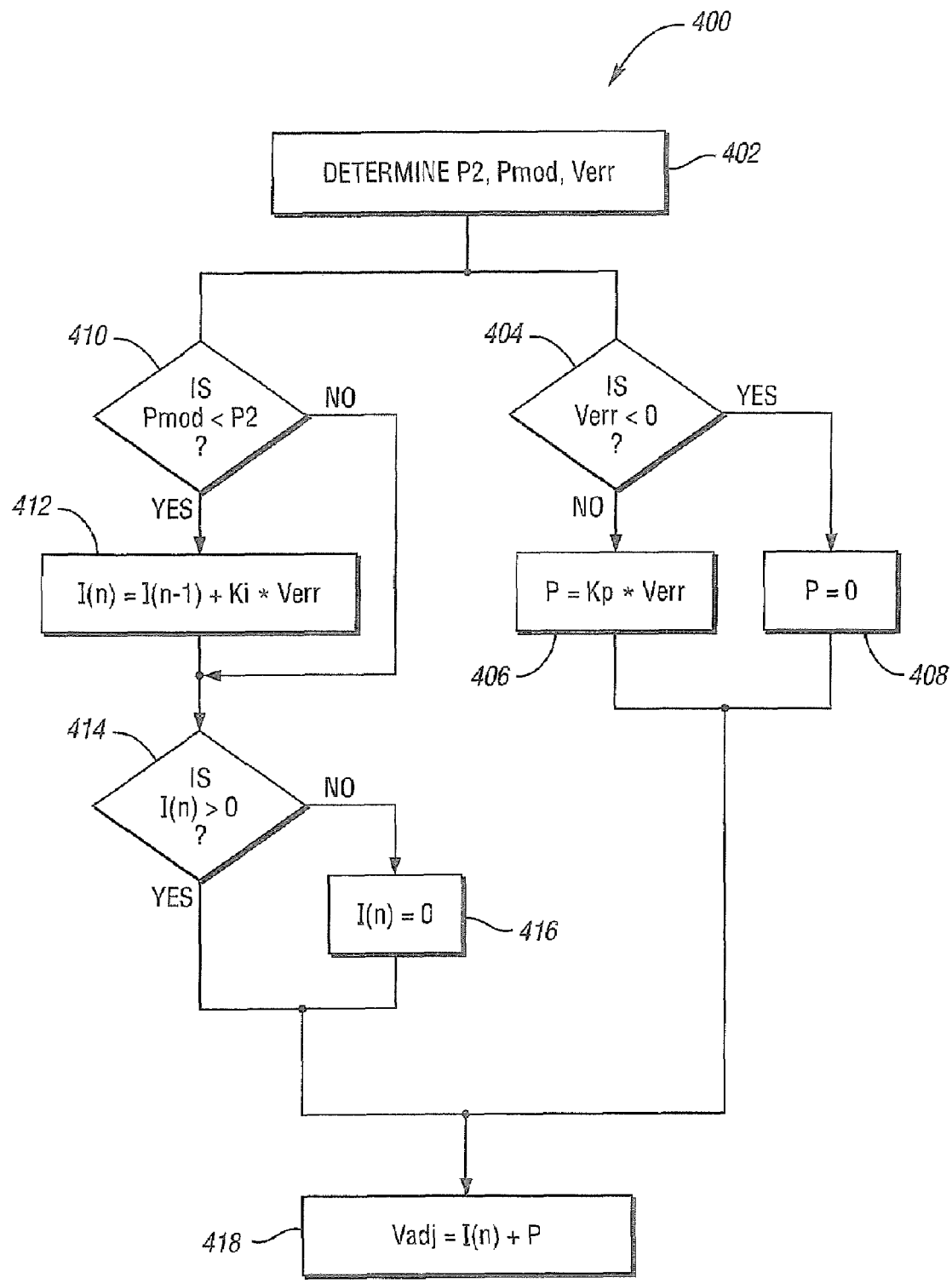
FIG. 4 is a flow diagram of a voltage adjustment determination represented in FIG. 3.

Referring to FIG. 4, a flow diagram of a voltage adjustment determination of the present invention is shown. The method 400 may be advantageously implemented in connection with the operational flow diagram 300 of the present invention. While FIG. 4 shows a method of determining the voltage adjustment signal, Vadj, the method is not intended to describe all possible determinations of Vadj.

As shown in step 402 in FIG. 4, a number of parameters are determined. The parameters include the second power demand signal, P2, the power demand modifier signal, Pmod, the battery voltage error signal, Verr, and the like. Determination of each of the parameters is described in detail, above. The voltage adjustment signal, Vadj, includes a proportional term, P, and an integral term, I. The proportional term is based at least in part on the sign of the battery voltage error, Verr (decision block 404). The proportional term, P, is generated by determining the product of a predetermined proportional gain (Kp) and the battery voltage error, Verr, when Verr is positive (block 406). When Verr is negative, the proportional term, P, is generated by setting P equal to zero (block 408).

The integral term, I, is based at least in part on the magnitude of the power modification, Pmod (decision block 410). When Pmod is greater than or equal to the second power demand, P2, the process falls through to decision block 414. When Pmod is less than P2, the I term (I(n)) is generated by adding a previously determined I term (I(n−1)) to the product of a predetermined integral gain (Ki) and the battery voltage error, Verr (block 412). The sign of the value I(n) is then determined (decision block 414), and the value of I(n) is set equal to zero when the sign of I(n) is determined to be negative (block 416). Accordingly, the value of the voltage adjustment, Vadj, is generated by determining the sum of the proportional term, P, and the integral term, I (block 418).

Of course, one skilled in the art would recognize that the step of determining P2 may be omitted such that the wheel power request, Preq, is generated by applying Padj directly to P1. When P2 is omitted, Padj is determined at least in part upon the value of P1, instead of P2.

As is readily apparent from the foregoing description, the present invention generally provides an improved system and an improved method for determining a wheel power request such that battery voltage remains above a reference discharge voltage. The improved system and method of the present invention may reduce or eliminate the occurrences of battery damage caused by over discharging the battery.

While the best mode for carrying out the invention has been described in detail, those familiar with the art to which this invention relates will recognize various alternative designs and embodiments for practicing the invention as defined by the following claims.

What is claimed is:

1. A method for controlling power to wheels in a vehicle, the vehicle having an electric storage device for providing power to an electric machine, the method comprising:
   determining a driver power demand for the vehicle;
   determining an electrical power loss for the vehicle;
   adding the electrical power loss to the driver power demand, thereby generating a first power demand;
   determining a second power demand by setting the second power demand equal to the first power demand minus the electrical power loss when the magnitude of the first power demand is not greater than a predetermined value, and setting the second power demand equal to the predetermined value minus the electrical power loss when the magnitude of the first power demand is greater than the predetermined value;
   determining a power adjustment based on at least one condition of the electric storage device; and
   applying the power adjustment to the second power demand, thereby generating a wheel power request.

2. The method of claim 1, the electric storage device including a battery, wherein the power adjustment is based on a reference discharge voltage for the battery, a measured discharge voltage for the battery, and a battery current.

3. The method of claim 2, wherein the reference discharge voltage is based on at least one of a state of charge of the battery and a temperature of the battery.

4. The method of claim 2, wherein determining the power adjustment comprises:
   determining a voltage error defined as a difference between the reference discharge voltage and the measured discharge voltage;
   determining a voltage adjustment based at least in part on the sign of the voltage error; and
   determining a power demand modifier defined as a product of the voltage adjustment and the battery current.

5. The method of claim 4, wherein determining the power adjustment further comprises:
   setting the power adjustment equal to the power demand modifier when the power demand modifier is not greater than the second power demand; and
   setting the power adjustment equal to the second power demand when the power demand modifier is greater than the second power demand.

6. The method of claim 4, wherein the voltage adjustment includes a term proportional to the voltage error and the proportional term is set equal to zero when the voltage error is negative.

7. The method of claim 4, wherein the battery current is a measured current draw for the battery when the measured current draw is not negative; and
   wherein the battery current is zero when the measured current draw is negative.

8. A method for controlling power to wheels in a vehicle, the vehicle having an electric storage device for providing power to an electric machine, the method comprising:
   determining a driver power demand for the vehicle;
   increasing the driver power demand by an electrical loss for the vehicle, thereby generating a first power demand;
   applying a limiting function to the first power demand such that the first power demand is not allowed to exceed a predetermined value, thereby generating an intermediate power demand;
   decreasing the intermediate power demand by the electrical loss, thereby generating a second power demand;
   determining a power adjustment based on at least one condition of the electric storage device; and
   applying the power adjustment to the second power demand, thereby generating a wheel power request.

9. The method of claim 8, the electric storage device including a battery, wherein the power adjustment is based on a reference discharge voltage for the battery, a measured discharge voltage for the battery, and a battery current.

10. The method of claim 9, wherein the reference discharge voltage is based on at least one of a state of charge of the battery and a temperature of the battery.

11. The method of claim 9, wherein determining the power adjustment comprises:
    determining a voltage error defined as a difference between the reference discharge voltage and the measured discharge voltage;
    determining a voltage adjustment based at least in part on the sign of the voltage error; and
    determining a power demand modifier defined as a product of the voltage adjustment and the battery current.

12. The method of claim 11, wherein determining the power adjustment further comprises:
    setting the power adjustment equal to the power demand modifier when the power demand modifier is not greater than the second power demand; and
    setting the power adjustment equal to the second power demand when the power demand modifier is greater than the second power demand.

13. The method of claim 11, wherein the voltage adjustment includes a term proportional to the voltage error and the proportional term is set equal to zero when the voltage error is negative.

14. The method of claim 11, wherein the battery current is a measured current draw for the battery when the measured current draw is not negative; and
    wherein the battery current is zero when the measured current draw is negative.

15. A vehicle, comprising:
    an electric machine configured to supply torque to propel the vehicle;
    an electric storage device including a battery and capable of supplying power to the electric machine; and
    a control system including at least one controller configured to:
    determine a first power demand for the vehicle based at least in part on a driver input,
    determine a second power demand based at least in part on the magnitude of the first power demand,
    determine a reference discharge voltage for the battery,
    receive inputs related to a measured discharge voltage for the battery and a measured current draw for the battery,
    determine a power adjustment based at least in part on the reference discharge voltage, the measured discharge voltage, and the measured current draw, and
    apply the power adjustment to the second power demand, thereby generating a wheel power request.

16. The vehicle of claim 15, wherein the at least one controller is further configured to set the second power demand equal to the first power demand when the magnitude of the first power demand is not greater than the predetermined value, and to set the second power demand equal to the predetermined value when the first power demand is greater than the predetermined value.

17. The vehicle of claim 15, wherein the at least one controller is further configured to receive inputs related to at least one of a state of charge of the battery and a temperature of the battery, and the reference discharge voltage is determined based on at least one of the state of charge of the battery and the temperature of the battery.

18. A method for controlling power to wheels in a vehicle, the vehicle having an electric storage device for providing power to an electric machine, the method comprising:

determining a power demand for the vehicle based at least in part on a driver input;

determining a power adjustment based on at least one condition of the electric storage device; and applying the power adjustment to the power demand, thereby generating a wheel power request, wherein determining the power adjustment comprises determining a voltage error defined as a difference between a reference discharge voltage and a measured discharge voltage, determining a voltage adjustment based at least in part on the sign of the voltage error, and determining a power demand modifier defined as a product of the voltage adjustment and a battery current.

* * * * *